United States Patent [19]

Rogers

[11] 4,276,015
[45] Jun. 30, 1981

[54] METHOD AND APPARATUS FOR MOLDING CLAY PIGEONS AND THE LIKE

[76] Inventor: Richard R. Rogers, 73 Lakeshore West, Lake Quivira, Kans. 66106

[21] Appl. No.: 926,032

[22] Filed: Jul. 19, 1978

[51] Int. Cl.³ .............................................. B29F 1/03
[52] U.S. Cl. .................................. 425/548; 425/549; 425/566; 425/571
[58] Field of Search ............... 425/564, 566, 548, 549, 425/571

[56] References Cited

U.S. PATENT DOCUMENTS

| 2,773,284 | 11/1956 | Kelly | 425/566 |
| 3,945,535 | 5/1976 | Leiste | 425/564 X |
| 4,125,352 | 11/1978 | Gellert | 425/566 |

*Primary Examiner*—Thomas P. Pavelko

*Attorney, Agent, or Firm*—Lowe, Kokjer, Kircher, Wharton & Bowman

[57] ABSTRACT

An injection molding machine includes complementary mold members which cooperate to present a mold cavity in the shape of a clay pigeon or other articles. An injection passage leading to the mold cavity receives a slidable pin of smaller diameter than the passage. The pin has a tapered tip which, when the pin is extended by a power cylinder, seats in an outlet opening of the passage to block the opening in a manner to prevent the formation of a sprue on the part. The pin is heated along with a surrounding sleeve to maintain the material in the passage in a molten state and to assure proper release of the part from the mold. When the pin is retracted, molding material is able to flow around it, through the injection passage, and into the mold cavity.

2 Claims, 3 Drawing Figures

METHOD AND APPARATUS FOR MOLDING CLAY PIGEONS AND THE LIKE

BACKGROUND AND SUMMARY OF THE INVENTION

This invention relates generally to injection molding and deals more particularly with an improved method and apparatus for molding various types of articles such as clay pigeons and the like.

At present, clay pigeons are typically formed on complication molding machines which are operated by cam devices. These machines are usually circular in shape and require a large number of carefully timed movements of the various operating components. Consequently, such machines are highly complex and costly, as well as being difficult to maintain in proper working order. Furthermore, due to the arrangement of the mold and the manner in which the molding is carried out, the parts often exhibit "flashing", i.e., burrs and rough areas on the edges.

Other types of molding machines have similar drawbacks. For example, injection molding equipment of the type currently used to mold simple plastic articles requires high pressure injection of the molding material. As a result, complicated clamping devices and high pressureseals are necessary, and additional problems inherently associated with high pressure operation are encountered. It is common for machines of this type to be equipped with an insert piece having a small diameter orifice through which the material is forced into the mold cavity. The material located in the orifice forms a sprue on the part which is difficult and expensive to remove.

It is the primary object of the present invention to provide an improved method and apparatus for molding clay pigeons and other articles such as chinaware, ceramic items, and various types of plastic products.

Another object of the invention is to provide a method and apparatus of the character described wherein the molded article is easily released from the mold. This important feature is achieved by providing a pin member in the injection passage which is heated to a high enough temperature to assure proper release of the part while avoiding undue damage to it.

Yet another object of the invention is to provide a method and apparatus of the character described which avoids the formation of sprues, flashing, or other significant imperfections on the part.

A further object of the invention is to provide a molding machine of the character described in which the temperatures and movements of the parts are accurately controlled.

An additional object of the invention is to provide a molding machine of the character described which operates at relatively low pressure.

A still further object of the invention is to provide a molding machine of the character described which is simple and economical to construct and which operates reliably without undue maintenance requirements.

Other and further objects of the invention, together with the features of novelty appurtenant thereto, will appear in the course of the following description.

DETAILED DESCRIPTION OF THE INVENTION

In the acccompanying drawing which forms a part of the specification and is to be read in conjunction therewith and in which like reference numerals are used to indicate like parts in the various views.

Figure 1:
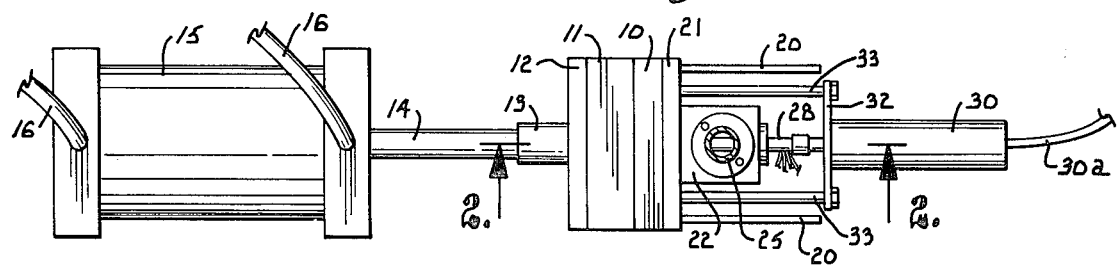
FIG. 1 is a top plan view of an injection molding machine constructed in accordance with the present invention.

Referring now to the drawing in more detail, the injection molding machine of this invention includes a male mold 10 and a female mold 11. The female mold 11 is carried on a mounting plate 12 having a projecting sleeve 13 which connects with the rod 14 of a pneumatic cylinder 15. The cylinder 15 is of the double acting type having fluid lines 16 for delivering fluid to extend and retract its piston rod. Retraction of the rod opens the mold by separating member 11 from member 10. Conversely, extension of the cylinder closes the mold by pressing the female and male mold components tightly together.

The molding surfaces of the male and female mold members 10 and 11 are contoured such that when closed, a mold cavity 18 is presented between them for receiving the molten material used to form the article which is being molded. For example, the mold cavity 18 may be in the shape of a clay pigeon 19 formed of an asphaltic material containing limestone and other desired substances. It is to be understood that other types of articles may be formed in the mold from substances such as chinaware and other types of ceramics or plastic materials, as well as other materials. The articles may be formed in any desired configuration by utillizing appropriately shaped mold components.

The female mold member 11 is equipped with guide posts 20 which fit slidably through the male mold member 10 and through a mounting plate 21 connected with mold 10. The guide posts 20 guide the mold components to insure that they open and close in the proper manner. Stripper pins or the like (not shown) are provided to separate the molded part from the mold in a conventional manner.

In accordance with the present invention, a valve block 22 is mounted to plate 21 on the side opposite that connected with mold 10. Mold 10, plate 21 and block 22 are bored to provide a continuous injection passage 23 (FIG. 2) which delivers the molding material to cavity 18. The passage 23 extends completely through mold 10 and terminates at the mold cavity. Passage 23 is circular in section.

The material is delivered to passage 23 through a vertical bore 24 which extends through block 22 and intersects with passage 23. Bore 24 is plugged at the bottom and connects at the top of block 22 with a delivery pipe 25. The pipe has a flange 25a which is bolted to the top of block 22 and sealed thereto by an o-ring 26. Material is supplied to pipe 25 from a suitable source (not shown) which delivers the material in a molten state and under sufficient pressure to force it into the mold cavity 18.

The injection passage 23 slidably receives an elongate, generally cylindrical metal pin 28 which is connected with the piston rod 29 of a double acting pneumatic cylinder 30. A coupling 31 secures the pin end to end with rod 29. Air is applied to cylinder 30 through air lines 30a in order to extend and retract rod 29.

Referring to FIG. 1, cylinder 30 is mounted on a bracket 32 which is in turn bolted to a pair of mounting posts 33. The opposite ends of the posts are attached to plate 21 in order to properly locate the pneumatic cylinder 30.

Figure 2:
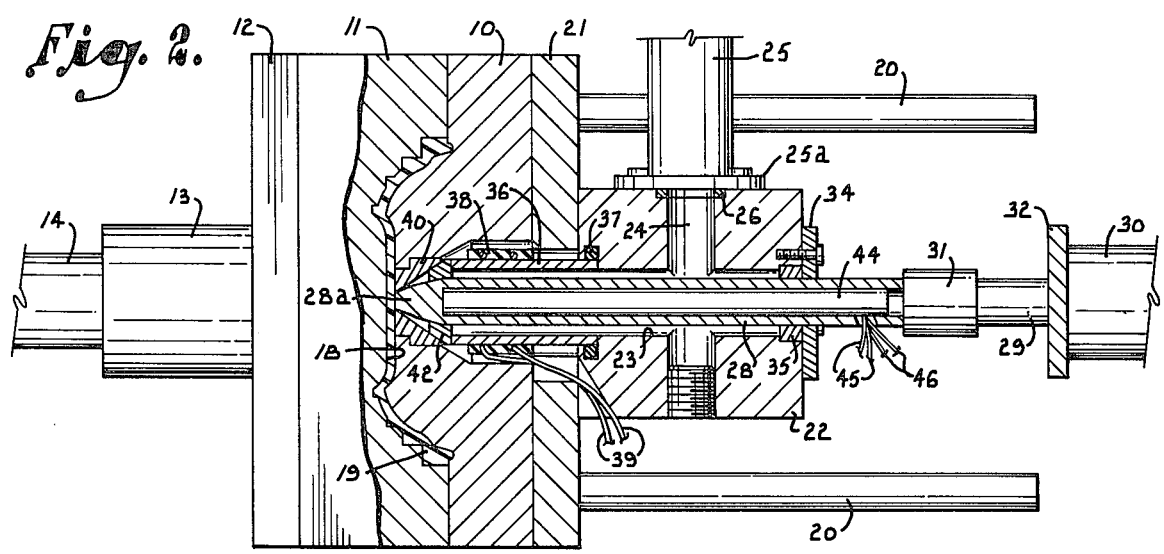
FIG. 2 is a fragmentary sectional view on an enlarged scale taken generally along line 2—2 of FIG. 1 in the direction of the arrows with the heated pin member in its blocking position.

As best shown in FIG. 2, pin 28 extends through a cover plate 34 which is bolted to block 22 at a location to cover the end of passage 23. A lip seal 35 seals against pin 28 to prevent molding material from leaking out of the passage. The diameter of pin 28 is considerably smaller than that of passage 23 to permit molding material to flow freely around the pin and through the passage.

An aluminum sleeve 36 is fitted in an enlarged portion of passage 23 which is located for the most part in mold 10 and plate 21. The sleeve has an inside diameter which is equal to the diameter of the portion of passage 23 extending through block 22. Accordingly, the distance between pin 28 and the wall of passage 23 is uniform along the length of the passage. An o-ring 37 seals the sleeve 36 with block 22.

Sleeve 36 is provided with an electrically resistive heater 38 having lead wires 39 that extend to a suitable source of electric current. The heater 38 is wrapped around the outside surface of sleeve 36 and acts to heat the sleeve when current is applied to the electrically resistive heater wires 39.

Figure 3:
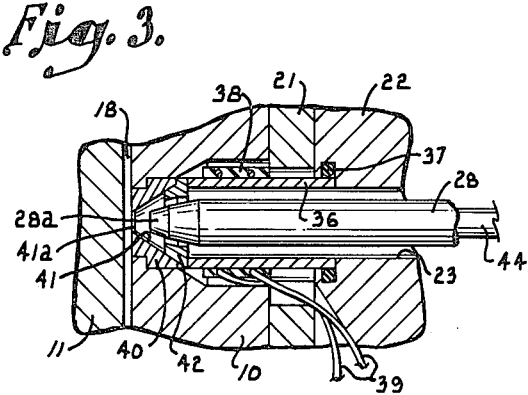
FIG. 3 is a fragmentary sectional view similar to the center portion of FIG. 2 but showing the pin member moved to its unblocking position.

A metal ring member 40 provides a seat for the end of pin 28. The ring is mounted to the male mold 10 at a location in passage 23 adjacent to the mold cavity 18. As best shown in FIG. 3, ring 40 is bored at 41 to provide a tapered terminal portion of passage 23 which terminates in a round opening 41a located adjacent the mold cavity. Passage 41 extends centrally through ring 40 and tapers gradually toward the opening 41a. The surface of ring 40 adjacent to the mold cavity is flat and forms a part of the mold surface. A seal between ring 40 and sleeve 38 is formed by a seal element 42.

The leading end of pin 28 is shaped to provide a tapered tip 28a which is tapered more gradually than passage 41. The end of tip 28a is equal in diameter to opening 41a so that it is able to completely plug or block the opening when pressed onto its seat, as shown in FIG. 2. The end surface of tip 28a is flat and forms part of the mold surface.

Pin 28 has a hollow interior which receives an electric heater 44. The heater fits snugly within the hollow interior region of the pin and has a pair of lead wires 45 which connect with a current source to supply electric current for heating the pin. Heater 44 may be any suitable type of electrically resistive heater. It includes a thermocouple which acts in a well known manner to control the temperature to which pin 28 is heated. A pair of wires 46 for the thermocouple lead to suitable controls which control the application of the current to the heater wires 45. When the temperature of pin 28, as sensed by the thermocouple, is less than the selected temperature, the thermocouple acts in a manner to apply current to wires 45 until the selected temperature is reached, at which time current to the heater wires is cut off. In this fashion, the temperature of pin 28 is continuously controlled.

In operation, the mold components 10 and 11 are tightly closed to form the mold cavity 18. Cylinder 30 is retracted to move pin 28 a short distance away from its seat to the retracted position shown in FIG. 3. The molding material can then flow through pipe 25 and passage 23 and into the mold cavity through opening 41a. Due to the heating of pin 28 and sleeve 38, the molding material is maintained in a molten state as it flows through passage 23 around the exterior surface of the pin.

After pin 28 has been held in the retracted position long enough to permit filling of the mold cavity, a timing valve (not shown) causes cylinder 30 to extend, thereby moving pin 28 to the extended FIG. 2 position wherein the pin is tightly seated against ring 40 to serve as a plug which blocks opening 41a. The molding material is thus confined within the mold cavity as the part hardens. The flat end surface of pin 28 forms a part of the boundary of the mold cavity.

With the pin remaining in the extended position (FIG. 2), the mold members 10 and 11 are preferably cooled by water or by some other means to accelerate hardening of the molded article. As the part hardens, the tip 28a of the pin is continuously heated to prevent the molding material from adhering to the pin or leaking around its edges and hardening. The pin 28 thus facilitates release of the article from the mold and prevents a sprue from forming in the injection passage.

When the part has hardened, the mold is opened and the molded part is removed by stipper pins (not shown) or a similar mechanism. Due to the relatively high temperature of the tip 28a, the molded part readily releases from the pin and from the mold components. After the part has been ejected, the mold closes and the pin is retracted to begin another cycle of operation.

It is noted that opening 41a is large enough to permit the molding material to be injected at relatively low pressure, such as 100 to 150 psi, since the material need not be forced through an aperture or any other small opening. This is to be contrasted with conventional injection molding machines which typically must operate at pressures of several thousand psi in order to force the material through restricted apertures. Due to the construction of the mold and the action of the pin 28, there are no sprues, burrs, flashings, or other significant irregularities on the clay pigeon 19 or other articles formed in the mold.

The pin 28 is preferably heated to a temperature substantially greater than that of the molding material that is injected through passage 23. By way of example, the temperature of the asphaltic material used to mold clay pigeons may be approximately 400° F. and the temperature of the pin may be in the range of approximately 500° F. to 550° F., i.e., 100° to 150° higher than the material. Due to the location of heater 44 adjacent tip 28a, the tip is heated to substantially the same temperature as the body of the pin. Of course, the temperatures vary when other types of materials are involved. Heating of the pin to such a high temperature is important in that the pin must be hot enough to easily release from the molded part. At the same time, the pin cannot be so hot that its tip 28a burns through or otherwise unduly damages the molded article. The thermocouple associated with heater 44 operates in the manner indicated to maintain the temperature of pin 28 within the desired range.

The heated sleeve 38 makes up for natural heat losses and is particularly important in avoiding excessive heat loss due to cooling of the male mold member 10. The application of heat to the sleeve is preferably controlled by arranging wires 39 in a slave relationship to the heater wires 45, so that the sleeve and pin are heated simultaneously whenever heat is called for by the thermocouple of the heater unit 44. In actual practice, it is contemplated that the timing of the molding cycle and the temperatures will be accurately controlled by electronic controls, although any suitable type of control system may be used.

From the foregoing, it will be seen that this invention is one well adapted to attain all the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawing is to be interpreted as illustrative and not in a limiting sense.

Having thus described my invention, I claim:

1. In an injection molding machine having male and female mold members supported for opening and closing movement and cooperating when closed to present a mold cavity, the improvement comprising:

a passage in one of said mold members for directing molding material to said mold cavity, said passage having an inlet adapted to receive molding material and an outlet opening disposed adjacent the mold cavity; a pin member supported in said passage for movement between a first position blocking said outlet opening and a second position wherein said opening is unblocked, said pin member being smaller than said passage to permit flow therethrough when said opening is unblocked;

power means for effecting movement of said pin member between the first and second position;

means for heating said pin member;

said pin member having a tip portion adapted to seat in said opening to block same when the pin member is in its first position; and said heating means including an additional heating means located in proximity to said tip portion of said pin member for maintaining the temperature of said tip portion to a temperature greater than that of the molding material.

2. In an injection molding machine having male and female mold members supported for opening and closing movement and cooperating when closed to present a mold cavity, the improvement comprising:

a passage in one of said mold members for directing molding material to said mold cavity, said passage having an inlet adapted to receive molding material and an outlet opening disposed adjacent the mold cavity;

a pin member supported in said passage for movement between a first position blocking said outlet opening and a second position wherein said opening is unblocked, said pin member being smaller than said passage to permit flow therethrough when said opening is unblocked;

power means for effecting movement of said pin member between the first and second positions;

means for heating said pin member;

said pin member having a tapered tip portion for blocking said outlet opening;

said passage having a terminal portion tapering to said outlet opening and large enough to accomodate movement of said tip portion therein;

said pin member presenting a hollow interior region terminating at a location adjacent said tip portion;

said heating means having an electrical heater disposed in said interior region; and a heating means located in proximity of the tip end portion of said pin member for maintaining the temperature thereof.

* * * * *